United States Patent
Sun et al.

(10) Patent No.: US 8,119,299 B2
(45) Date of Patent: Feb. 21, 2012

(54) COOLANT SYSTEM FOR FUEL PROCESSOR

(75) Inventors: Hongqiao (Bruce) Sun, Sugar Land, TX (US); W. Spencer Wheat, Missouri City, TX (US); Vesna R. Mirkovic, Pearland, TX (US); Daniel G. Casey, Kingwood, TX (US)

(73) Assignee: Texaco Inc., San Ramon, CA (US)

( * ) Notice: Subject to any disclaimer, the term of this patent is extended or adjusted under 35 U.S.C. 154(b) by 714 days.

(21) Appl. No.: 10/954,679

(22) Filed: Sep. 30, 2004

(65) Prior Publication Data

US 2005/0042486 A1  Feb. 24, 2005

Related U.S. Application Data

(63) Continuation-in-part of application No. 10/407,401, filed on Apr. 4, 2003, now abandoned.

(51) Int. Cl.
*H01M 8/04* (2006.01)
(52) U.S. Cl. ........ 429/433; 429/434; 429/438; 429/423; 429/416
(58) Field of Classification Search ............... 429/26, 429/19, 20, 24, 34, 17; 422/198, 105, 191, 422/187, 188.193; 165/71, 134.1
See application file for complete search history.

(56) References Cited

U.S. PATENT DOCUMENTS

| 4,673,624 | A | 6/1987 | Hockaday |
| 5,731,101 | A | 3/1998 | Sherif et al. |
| 5,827,602 | A | 10/1998 | Koch et al. |
| 6,316,134 | B1 * | 11/2001 | Cownden et al. ............... 429/19 |
| 6,682,838 | B2 | 1/2004 | Stevens |
| 6,824,577 | B2 | 11/2004 | Deshpande |
| 2002/0004152 | A1 | 1/2002 | Clawson et al. |
| 2002/0028366 | A1 | 3/2002 | Haltiner |
| 2002/0083646 | A1 | 7/2002 | Deshpande et al. |

(Continued)

FOREIGN PATENT DOCUMENTS

DE    10041712    3/2002

(Continued)

OTHER PUBLICATIONS

Suarez, et al., "Synthesis and physical-chemical properties of ionic liquids based on 1-*n*-butyl-3-methylimidazolium cation," *J. Chim. Phys.* 95:1828-1839 (1998).

(Continued)

*Primary Examiner* — Raymond Alejandro
(74) *Attorney, Agent, or Firm* — Frank C. Turner; Melissa Patangia; Christopher D. Northcutt

(57) ABSTRACT

A coolant subsystem for use in a fuel processor and a method for its operation are disclosed. In accordance with a first aspect, the coolant subsystem is separate from the feed to the processor reactor and is capable of circulating a coolant through the processor reactor. In accordance with a second aspect, the constituent elements of the fuel processor are housed in a cabinet, and the coolant subsystem is capable of cooling both the processor reactor and the interior of the cabinet. In various alternatives, the fuel processor can be employed to reform a fuel for a fuel cell power plant and/or may be used to provide thermal control for unrelated mechanical systems.

23 Claims, 7 Drawing Sheets

U.S. PATENT DOCUMENTS

| | | | |
|---|---|---|---|
| 2002/0088740 A1 | 7/2002 | Krause et al. | |
| 2002/0090326 A1 | 7/2002 | Deshpande | |
| 2002/0090327 A1 | 7/2002 | Deshpande | |
| 2002/0090334 A1 | 7/2002 | Stevens et al. | |
| 2002/0094310 A1* | 7/2002 | Krause et al. | 422/191 |
| 2002/0098129 A1 | 7/2002 | Martin et al. | |
| 2002/0155329 A1 | 10/2002 | Stevens | |
| 2003/0064010 A1* | 4/2003 | Allen | 422/190 |
| 2007/0128476 A1* | 6/2007 | Ballantine et al. | 429/13 |
| 2007/0189938 A1* | 8/2007 | Valensa | 422/198 |

FOREIGN PATENT DOCUMENTS

| | | |
|---|---|---|
| EP | 0743694 | 11/1996 |
| EP | 0957063 | 11/1999 |
| JP | 62-254365 | 11/1987 |
| WO | WO0126174 | 4/2001 |
| WO | WO02087745 | 11/2002 |

OTHER PUBLICATIONS

Wilkes, et al., "Air and Water Stable 1-Ethyl-3-methylimidazolium Based Ionic Liquids," *J. Chem. Soc., Chem. Commun.* 965-967 (1992).

Fannin, Jr., et al., "Properties of 1,3-Dialkylimidazolium Chloride—Aluminum Chloride Ionic Liquids. 2. Phase Transitions, Densities, Electrical Conductivities, and Viscosities," *J. Phys. Chem.* 88:2614-2621 (1984).

Fuller, et al., "Structure of 1-Ethyl-3-methylimidazolium Hexafluorophosphate: Model for Room Temperature Molten Salts," *J. Chem. Soc., Chem. Commun.* 299-300 (1994).

Bowlas, et al., "Liquid-crystalline ionic liquids," *Chem. Commun.* 1625-1626 (1996).

Bonhote, et al., "Hydrophobic, Highly Conductive Ambient-Temperature Molten Salts," *Inorg. Chem.* 35:1168-1178 (1996).

* cited by examiner

COOLANT SYSTEM FOR FUEL PROCESSOR

The present application is a continuation-in-part application claiming priority to U.S. patent application Ser. No. 10/407,401 (abandoned), which was filed on Apr. 4, 2003. The complete disclosure of this parent application is hereby incorporated by reference for all purposes.

BACKGROUND OF THE INVENTION

1. Field of the Invention

The present invention pertains to fuel cell power plants and, more particularly, to a coolant system for an integrated fuel cell power plant.

2. Description of the Related Art

Fuel cell technology is an alternative energy source for more conventional energy sources employing the combustion of fossil fuels. A fuel cell typically produces electricity, water, and heat from a fuel and oxygen. More particularly, fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of "fuel processors" or "reformers" to convert the hydrocarbons to a hydrogen rich gas stream which can be used as a feed for fuel cells. Hydrocarbon-based fuels, such as natural gas, LPG, gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulphurization, high temperature water-gas shift, low temperature water-gas shift, selective CO oxidation, or selective CO methanation. Alternative processes include hydrogen selective membrane reactors and filters.

Thus, many types of fuels can be used, some of them hybrids with fossil fuels, but the ideal fuel is hydrogen. If the fuel is, for instance, hydrogen, then the combustion is very clean and, as a practical matter, only the water is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a relatively pure hydrogen stream used to fuel the fuel cell.

A processor for a typical Polymer Electrolyte Fuel Cell ("PEFC"), also known as Proton Exchange Membrane Fuel Cell ("PEMFC"), generally comprises of reactor sections for hydrocarbon reforming, water gas shift and oxidation reactions. The reactions are carried at elevated temperatures and are a combination of heat generating, heat consuming or constant temperature variety. Therefore, heat management is critical for proper operation of the processor. Hot reaction products can be used to preheat the reactants, while cooling the products, thus managing the heat within the processor.

One difficulty with conventional cooling subsystems is the dependence between the reactor cooling and the temperatures of the reactor feeds and products. Another problem is that the fuel cell power plant, i.e., the fuel cell and its fuel processor, are frequently housed in a cabinet, which causes additional heat management problems. Conventional approaches to these problems applies a separate cabinet cooler. However, the separate cabinet coolers adversely impact the power and cost efficiencies of the power plant as a whole.

The present invention is directed to resolving, or at least reducing, one or all of the problems mentioned above.

SUMMARY OF THE INVENTION

A coolant subsystem for use in a fuel processor and a method for its operation are disclosed. In accordance with one aspect of the invention, the coolant subsystem is separate from the feed to the processor reactor and is capable of circulating a coolant through the processor reactor. In accordance with a second aspect of the present invention, the constituent elements of the fuel processor are housed in a cabinet, and the coolant subsystem is capable of cooling both the processor reactor and the interior of the cabinet.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
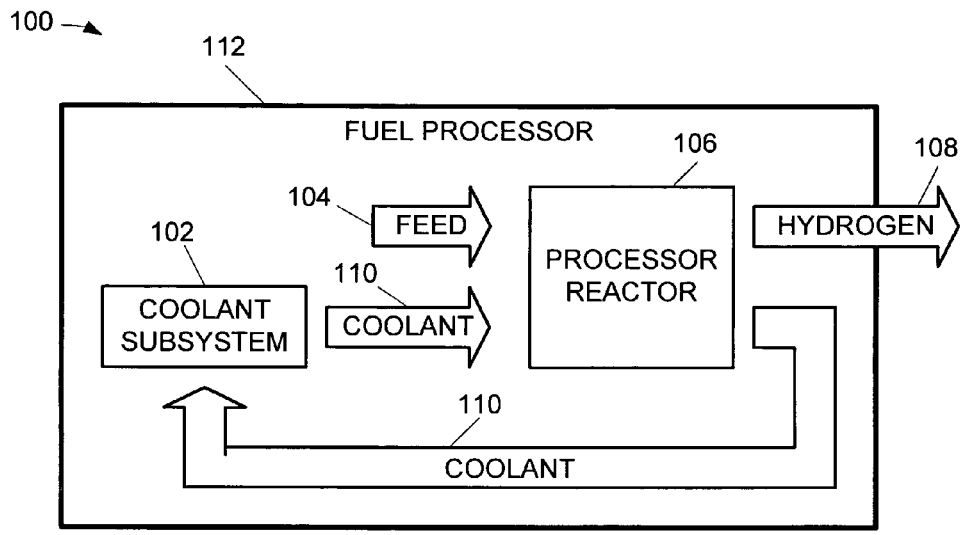
FIG. 1 conceptually illustrates a fuel processor constructed and operated in accordance with the present invention.

FIG. 1 conceptually illustrates a fuel processor 100 constructed in accordance with the present invention. The fuel processor 100 comprises a coolant subsystem 102, a feed 104, and a processor reactor 106 that produces a hydrogen (or hydrogen-rich) gas stream 108. In accordance with one aspect of the invention, the coolant subsystem 102 is separate from the feed 104 and is capable of circulating a coolant 110 through the processor reactor 106. The coolant 110 may be any suitable coolant known to the art, e.g., water, a glycol, an oil, an alcohol, or the like. In accordance with a second aspect of the present invention, the constituent elements of the fuel processor 100 are housed in a cabinet 112, and the coolant subsystem 102 is capable of cooling both the processor reactor 106 and the interior of the cabinet 112.

Figure 2:
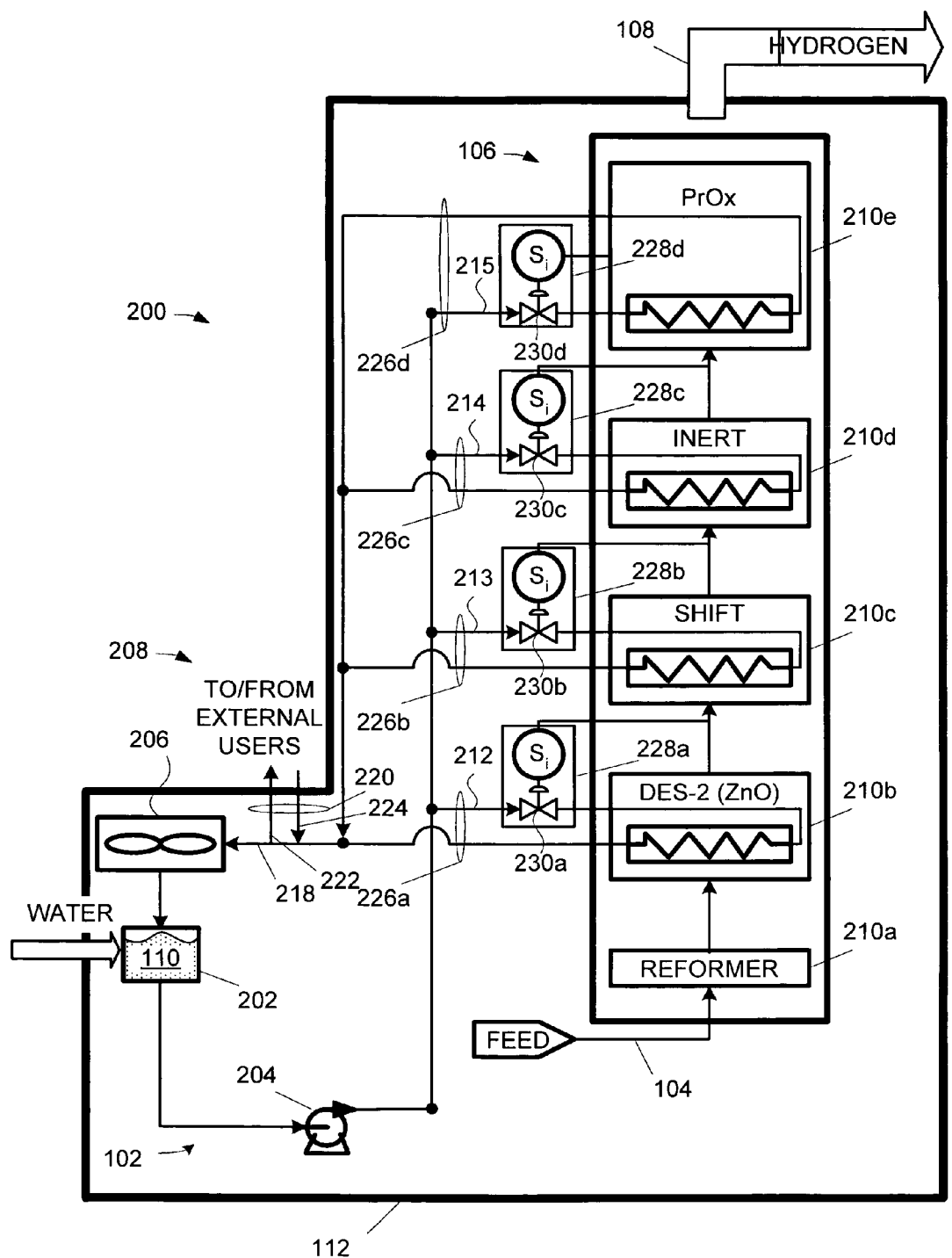
FIG. 2 illustrates one particular embodiment of the fuel processor in FIG. 1.

FIG. 2 conceptually illustrates one particular embodiment 200 of the fuel processor 100 in FIG. 1. In pertinent part, and in general, the fuel processor 200 pumps the coolant 110 stored in a coolant storage, or reservoir, 202 through the coolant subsystem 102, which comprises a heat exchange loop. In the illustrated embodiment, the coolant 110 is water. More particularly, the pump 204 pumps the coolant 110 from the reservoir 202 through the processor reactor 106 and a cooler 206, and back into the reservoir 202. The temperature controlled coolant 110 is also, in this particular embodiment, supplied to and returned from one or more external users 208 between the processor reactor 106 and the cooler 206 in the illustrated embodiment. The "external users" 208 may include mechanical systems not otherwise associated with the fuel processor 200 or any power plant of which it may be associated. For instance, the fuel processor 200 may power a power plant for a building, and the external user 208 in this situation may be the air conditioning/heating mechanical system for the building.

The processor reactor 106 in the illustrated embodiment comprises several stages, including a reformer stage 210a, a desulphurization stage 210b, a shift stage 210c, an inert stage 210d, and a preferential oxidizing stage 210e. The reformer stage 210a is an autothermal reformer ("ATR"), and may be implemented using any suitable reformer known to the art. Note that alternative embodiments may employ other stages in addition to or in lieu of those illustrated, depending on the design constraints imposed by the intended end-use.

In the illustrated embodiment, the coolant subsystem 102 circulates coolant individually to the stages 210b-210e through a respective one of a plurality of branches 226a-226d. Each of the branches 226a-226d includes a temperature control unit 228a-228d. Each temperature control unit 228a-228d includes a temperature sensor $S_t$ sensing the temperature in a respective stage 210b-210e and an actuator 230a-230d. Each actuator 230a-230d operates responsive to the sensed temperature in the respective stage 210b-210e to throttle the flow of coolant 110 through the respective branch 226a-226d.

Figure 3:
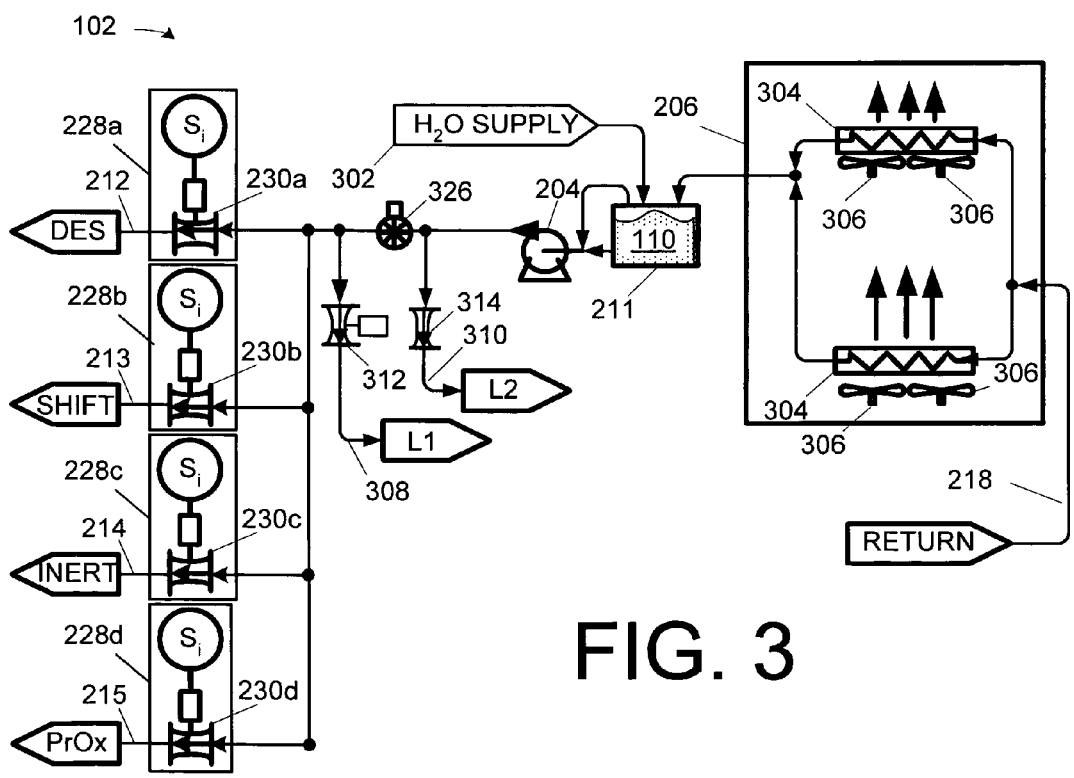
FIG. 3 depicts one particular implementation of the coolant subsystem of FIG. 2.

FIG. 3 details one particular implementation of the cooler 206 in the coolant subsystem 102 of the illustrated embodiment. Referring now to both FIG. 2 and FIG. 3, coolant 110 is drawn from an external water supply 302 (shown in FIG. 3) into the reservoir 202 and circulated by the pump 204. The pump 204 circulates the coolant 110 to various parts of the processor reactor 106 and subsystems associated with it through the feeds DES, SHIFT, INERT, and PROX (shown in FIG. 3) over the lines 212-215. Coolant 110 previously circulated to the processor reactor 106 is returned to the coolant subsystem 102 through the feed RETURN (shown in FIG. 3) over the line 218. Note that the coolant subsystem 102 is separate from the feed 104 and is capable of circulating the coolant 110 through the processor reactor 106.

Heat exchanged to the coolant 110 by the processor reactor 106 components is dumped to the environment through the cooler 206. The cooler 206 in the illustrated embodiment includes two heat exchangers 304 and a plurality of fans 306. The fans 306 facilitate the heat exchange through the heat exchangers 304. Note that the number of heat exchangers 304 and fans 306 is not material to the practice of the invention and that alternative embodiments may employ, e.g., one or three heat exchangers 304 and fans 306. The fans 306 also circulate air from the interior of the cabinet 112 (shown in FIG. 1) to the exterior of the cabinet 112, i.e., they cool the interior of the cabinet 112 by circulating the heated air to the environment. Thus, the coolant subsystem 102 is capable of cooling both the processor reactor 106 and the interior of the cabinet 112 at the same time.

The coolant subsystem 102 of the illustrated embodiment also can provide heating and/or cooling to other parts of the fuel processor 200, or even to systems outside the fuel processor 200. As was previously noted, the fuel processor 200 can provide thermal control to external users 208, as is shown in FIG. 2. This functionality is provided through a connection 220, which comprises an outlet 222 and an inlet 224 through which the coolant 110 may be circulated to and from the external users 208. As is shown in FIG. 3, the coolant subsystem 102 can provide cooling to other parts of the fuel processor 102 through the lines 308, 310 and the feeds L1, L2. Note that the lines 308, 310 circulate coolant 110 from the reservoir 211, i.e., cooled coolant 110. Note also that the flow of coolant 110 through the lines 308, 310 can be controlled not only in a gross sense by operation of the pump 204, but also in a finer sense by the valves 312, 314.

Figure 4:
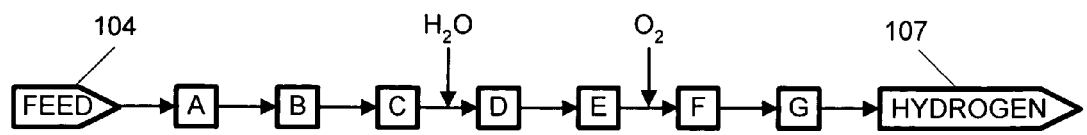
FIG. 4 graphically illustrates the reforming process of the autothermal reformer of the fuel processor first shown in FIG. 2.

In operation, the processor reactor 106 reforms the feed 104 into the hydrogen, or hydrogen enriched, gas stream 108 and effluent byproducts, such as water. The feed 104 in the illustrated embodiment conveys a fuel, air, and water mixture from an oxidizer (not shown). Note that the effluent water byproduct (not shown) from the operation of the processor reactor 106 may be circulated back into the coolant subsystem 102 as a coolant 110 or may be drained from the fuel processor 200. FIG. 4 depicts a general process flow diagram illustrating the process steps included in the illustrative embodiments of the present invention. The following description associated with FIG. 4 is adapted from U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1).

One of ordinary skill in the art should appreciate that a certain amount of progressive order is needed in the flow of the reactants through the processor reactor 106. The fuel processor 200 feed 104 includes a hydrocarbon fuel, oxygen, and water mixture. The oxygen can be in the form of air, enriched air, or substantially pure oxygen. The water can be introduced as a liquid or vapor. The composition percentages of the feed components are determined by the desired operating conditions, as discussed below. The fuel processor effluent stream from of the present invention includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream).

Process step A is an autothermal reforming process in which, in one particular embodiment, two reactions, a partial oxidation (formula I, below) and an optional steam reforming (formula II, below), are performed to convert the feed stream 104 into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

The feed 104 is received by the processor reactor 106 from an oxidizer (not shown). A higher concentration of oxygen in the feed stream favors partial oxidation whereas a higher concentration of water vapor favors steam reforming. The ratios of oxygen to hydrocarbon and water to hydrocarbon are therefore characterizing parameters that affect the operating temperature and hydrogen yield.

The operating temperature of the autothermal reforming step A can range from about 550° C. to about 900° C., depending on the feed conditions and the catalyst. The ratios, temperatures, and feed conditions are all examples of parameters controlled by the control system of the present invention. The illustrated embodiment uses a catalyst bed of a partial oxidation catalyst in the reformer stage 210a with or without a steam reforming catalyst.

Process step B is a cooling step performed in a cooling stage (not shown) for cooling the synthesis gas stream from process step A to a temperature of from about 200° C. to about 600° C., preferably from about 375° C. to about 425° C., to prepare the temperature of the synthesis gas effluent for the process step C (discussed below). This cooling may be achieved with heat sinks, heat pipes or heat exchangers depending upon the design specifications and the need to recover/recycle the heat content of the gas stream using any suitable type of coolant. For instance, the coolant for process step B may be the coolant 110 of the coolant subsystem 102.

Process step C is a purifying step, performed in the desulphurization stage 210b, and employs zinc oxide (ZnO) as a hydrogen sulfide absorbent. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet, etc.). Desulphurization is accomplished by converting the hydrogen sulfide to water in accordance with the following reaction formula III:

$$H_2S + ZnO \rightarrow H_2O + ZnS \qquad (III)$$

The reaction is preferably carried out at a temperature of from about 300° C. to about 500° C., and more preferably from about 375° C. to about 425° C.

Still referring to FIG. 4, the effluent stream may then be sent to a mixing step D performed in module (not shown), in which water received from a water subsystem (not shown) is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G (discussed below). This temperature is also controlled by the control system of the present invention.

Process step E, performed in the shift stage 210c, is a water gas shift reaction that converts carbon monoxide to carbon dioxide in accordance with formula IV:

$$H_2O + CO \rightarrow H_2 + CO_2 \qquad (IV)$$

The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step. This temperature and concentration are more parameters controlled by the control system of the present invention.

Returning again to FIG. 4, process step F, performed in the inert stage 210d, is a cooling step. Process step F reduces the temperature of the gas stream to produce an effluent having a temperature preferably in the range of from about 90° C. to about 150° C. Oxygen from an air subsystem (not shown) is also added to the process in step F. The oxygen is consumed by the reactions of process step G described below.

Process step G, performed in the preferential oxidation stage 210e, is an oxidation step wherein almost all of the remaining carbon monoxide in the effluent stream is converted to carbon dioxide. The processing is carried out in the presence of a catalyst for the oxidation of carbon monoxide. Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \qquad (V)$$

$$H_2 + \tfrac{1}{2}O_2 \rightarrow H_2O \qquad (VI)$$

The preferential oxidation of carbon monoxide is favored by low temperatures. Since both reactions produce heat, it may be advantageous to optionally include a cooling element such as a cooling coil disposed within the process. The operating temperature of process is preferably kept in the range of from about 90° C. to about 150° C. Process step G reduces the carbon monoxide level to preferably less than 50 ppm, which is a suitable level for use in fuel cells.

The effluent 108 exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

Note that each of the process steps A-G described above occurs within specified temperature ranges. The precise temperatures in the ranges are not material to the practice of the invention. Indeed, the nature and order of the steps are implementation specific depending on feed 104 input and the product gas stream 108 for a given application. Thus, the precise temperatures in the temperature ranges will be driven by implementation specific design constraints.

Returning now to FIG. 2 and FIG. 3, the coolant subsystem 102 is used to help achieve the temperatures for the process steps A-F, whatever they may be in a given embodiment. Each of the stages 210b-210e is cooled by a respective branch 226a-226d of the coolant subsystem 102. The temperature sensor $S_i$ of each temperature control unit 228a-228d senses the temperature within its respective stage 210b-210e. If the temperature within the respective stage 210b-210e approaches or exceeds the upper bound of the desired temperature range for the respective process step A-G, the respective temperature control unit 228a-228d opens the respective actuator 230a-230d to increase the flow of coolant 110 therethrough. If the temperature within the respective stage 210b-210e approaches or exceeds the lower bound of the desired temperature range for the respective process step A-G, the respective temperature control unit 228a-228d closes the respective actuator 230a-230d to decrease the flow of coolant 110 therethrough.

As the temperature control units 228a-228d control the temperature within their respective stages 210b-210e, the coolant 110 is circulated through the cooler 206. The heat exchanged from the stages 210b-210e is dumped to the atmosphere. As was described above, this is accomplished by the fans 306 blowing air across the heat exchangers 304. Blowing the air across the heat exchangers 304 also removes heated air from the cabinet 112 to the exterior of the cabinet 112. Thus, the interior of the cabinet 112 is cooled as the coolant subsystem 102 controls the temperatures of the process steps A-F in the stages 210a-210e.

Figure 5:
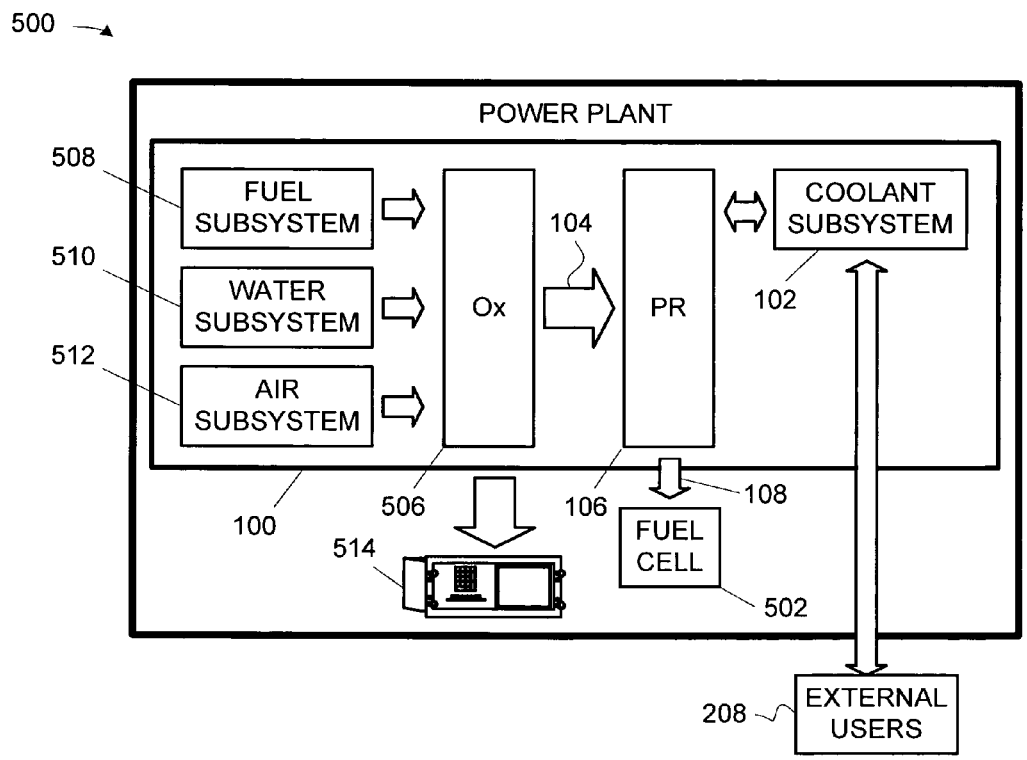
FIG. 5 conceptually illustrates an integrated fuel cell power plant fueled by the hydrogen gas stream produced by the fuel processor of FIG. 1.

As will be appreciated by those in the art having the benefit of this disclosure, fuel processor 100 in FIG. 1 will have additional components not shown. As should also be appreciated, the fuel processor 100 can be used in a variety of different contexts. FIG. 5 conceptually illustrates a fuel cell power plant 500 in which the processor reactor ("PR") 106 produces the hydrogen gas stream 108 to power a fuel cell 502. The power plant 500 is an "integrated" power plant, i.e., the operation of fuel processor 102 and the fuel cell 502 are interdependent. The fuel processor 102 and fuel cell 502 are both housed in a cabinet 112. The fuel cell 504 is preferably a typical Polymer Electrolyte Fuel Cell ("PEFC"), also known as Proton Exchange Membrane Fuel Cell ("PEMFC"). However, other types of fuel cells may be used. Note that not all aspects of the invention are limited to application in such an integrated power plant. Thus, some embodiments may be employed in a power plant that is not integrated.

In the embodiment illustrated in FIG. 5, the fuel processor 500 more particularly comprises several modular physical subsystems, namely:
- the processor reactor 106, which is an autothermal reformer ("ATR"), that performs an oxidation-reduction reaction that reforms a fuel input to the fuel processor 100 into a gas 108 for the fuel cell 502;
- an oxidizer 506, which is an anode tailgas oxidizer ("ATO") in the illustrated embodiment, that preheats water, fuel, and air to create a fuel mixture delivered as the feed 104 to the processor reactor 106;
- a fuel subsystem 508, that delivers an input fuel (natural gas, in the illustrated embodiment) to the oxidizer 506 for mixing into the feed 104 delivered to the processor reactor 106;
- a water subsystem 510, that delivers water to the ATO 206 for mixing into the feed 104 delivered to the processor reactor 106;
- an air subsystem 512, that delivers air to the ATO 206 for mixing into the feed 104 delivered to the processor reactor 106; and
- a coolant subsystem 102, that controls temperatures in the operation of the processor reactor 106 in a manner described above.

The power plant 500 also includes the control system 514 that controls the operation of the power plant 500 as a whole. One task executed by the control system 514 is the temperature control for the process of the processor reactor 106 through the temperature control units 228a-228d, as described above.

Figure 6A:
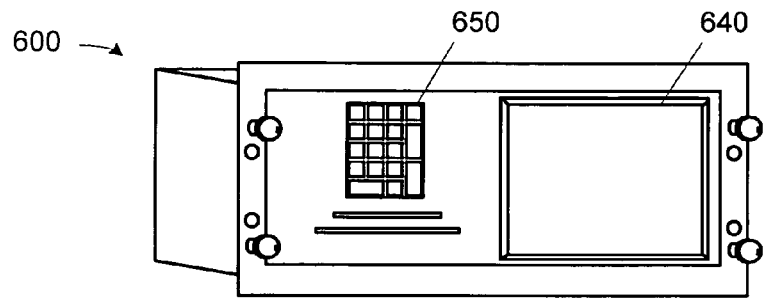
FIG. 6A and FIG. 6B conceptually illustrate a computing apparatus as may be used in the implementation of one particular embodiment of the present invention.
Figure 6B:
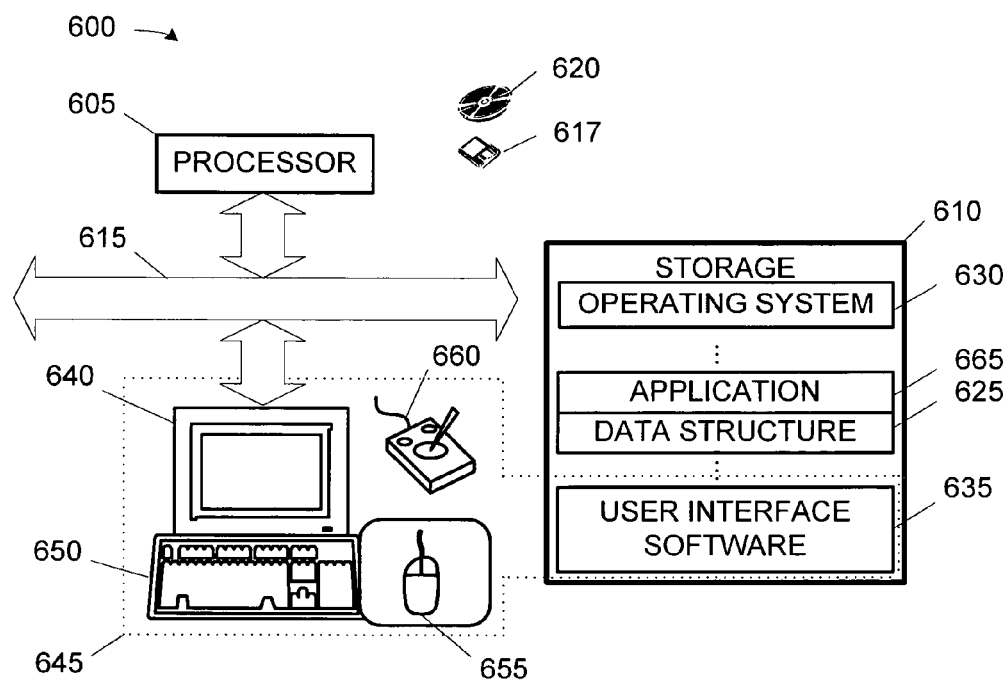

One particular implementation 600 of the control system 514, first shown in FIG. 2, is illustrated in FIG. 6A and FIG. 6B. Note that, in some embodiments, the control system may be implemented on a computing system comprising a number of computers such as the control system 514, each of which may control some designated facet of the operation of the fuel processor 100. However, in the illustrated embodiment, the computing apparatus 600 controls all aspects of the fuel processor 100 operation not under manual control. The computing apparatus 600 is rack-mounted, but need not be rack-mounted in all embodiments. Indeed, this aspect of any given implementations is not material to the practice of the invention. The computing apparatus 600 may be implemented as a desktop personal computer, a workstation, a notebook or laptop computer, an embedded processor, or the like.

The computing apparatus 600 illustrated in FIG. 6A and FIG. 6B includes a processor 605 communicating with storage 610 over a bus system 615. The storage 610 may include a hard disk and/or random access memory ("RAM") and/or removable storage such as a floppy magnetic disk 617 and an optical disk 620. The storage 610 is encoded with a data structure 625 storing the data set acquired as discussed above, an operating system 630, user interface software 635, and an application 665. The user interface software 635, in conjunction with a display 640, implements a user interface 645. The user interface 645 may include peripheral I/O devices such as a key pad or keyboard 650, a mouse 655, or a joystick 660. The processor 605 runs under the control of the operating system 630, which may be practically any operating system known to the art. The application 665 is invoked by the operating system 630 upon power up, reset, or both, depending on the implementation of the operating system 630.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 7:
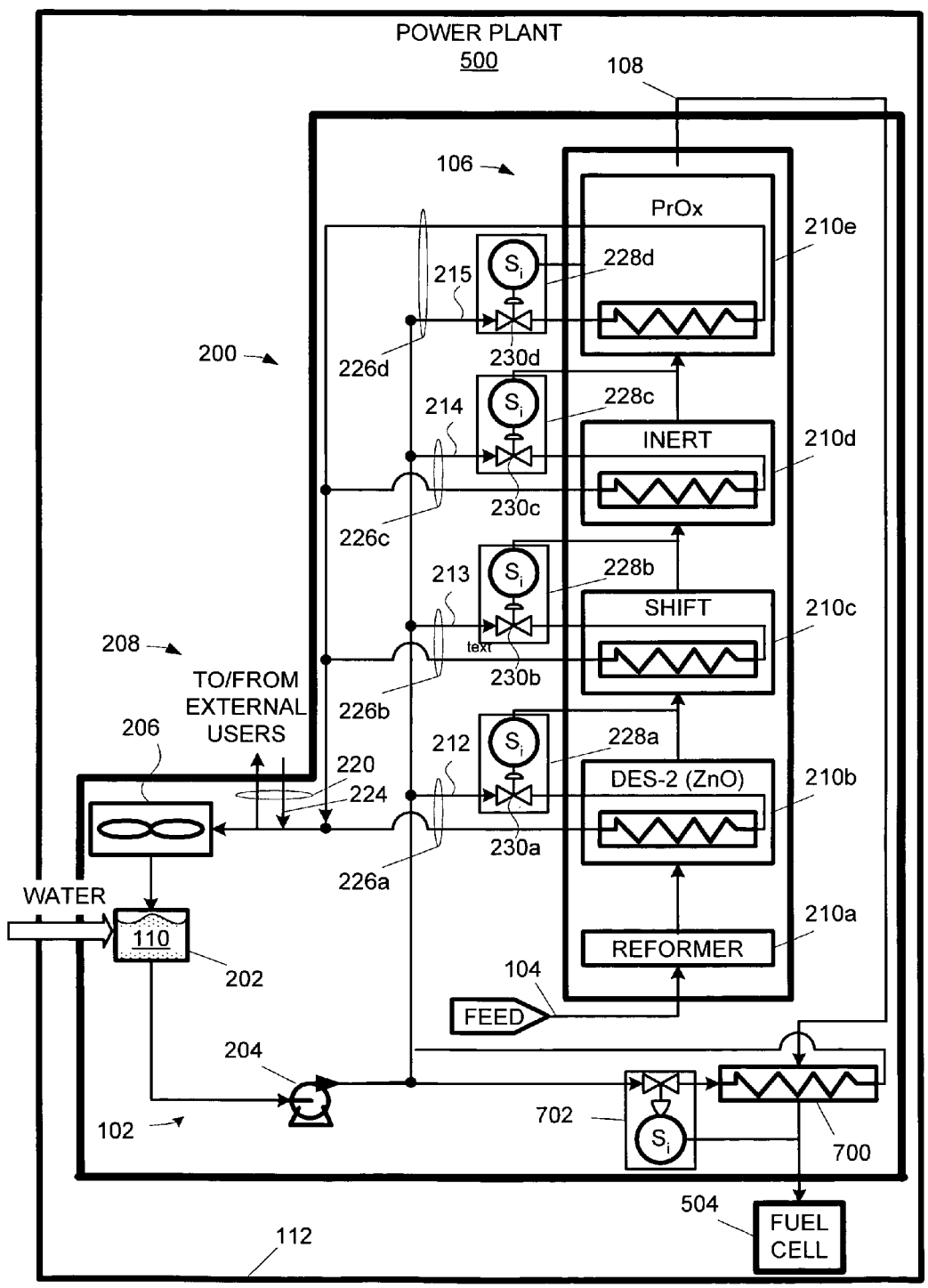
FIG. 7 conceptually illustrates the operational interface between the fuel processor and the fuel cell of the power plant of FIG. 5.

FIG. 7 graphically illustrates the operational interface between the fuel processor 100 and the fuel cell 504 first shown in FIG. 5. Note that the interface includes a heat exchanger 700 through which coolant 110 may be circulated from the coolant subsystem 102. The heat exchange is controlled through a temperature control unit 702 that throttles the flow of the coolant 110 through the heat exchanger 700 responsive to the sensed temperature of the stream 108. The temperature control unit 702 is also controlled by the control system 514 in the same manner as the temperature control units 228a-228d. Thus, the heat exchanger 700 and the temperature control unit 702 comprise, in this particular embodiment, a portion of the coolant subsystem 102.

Figure 8:
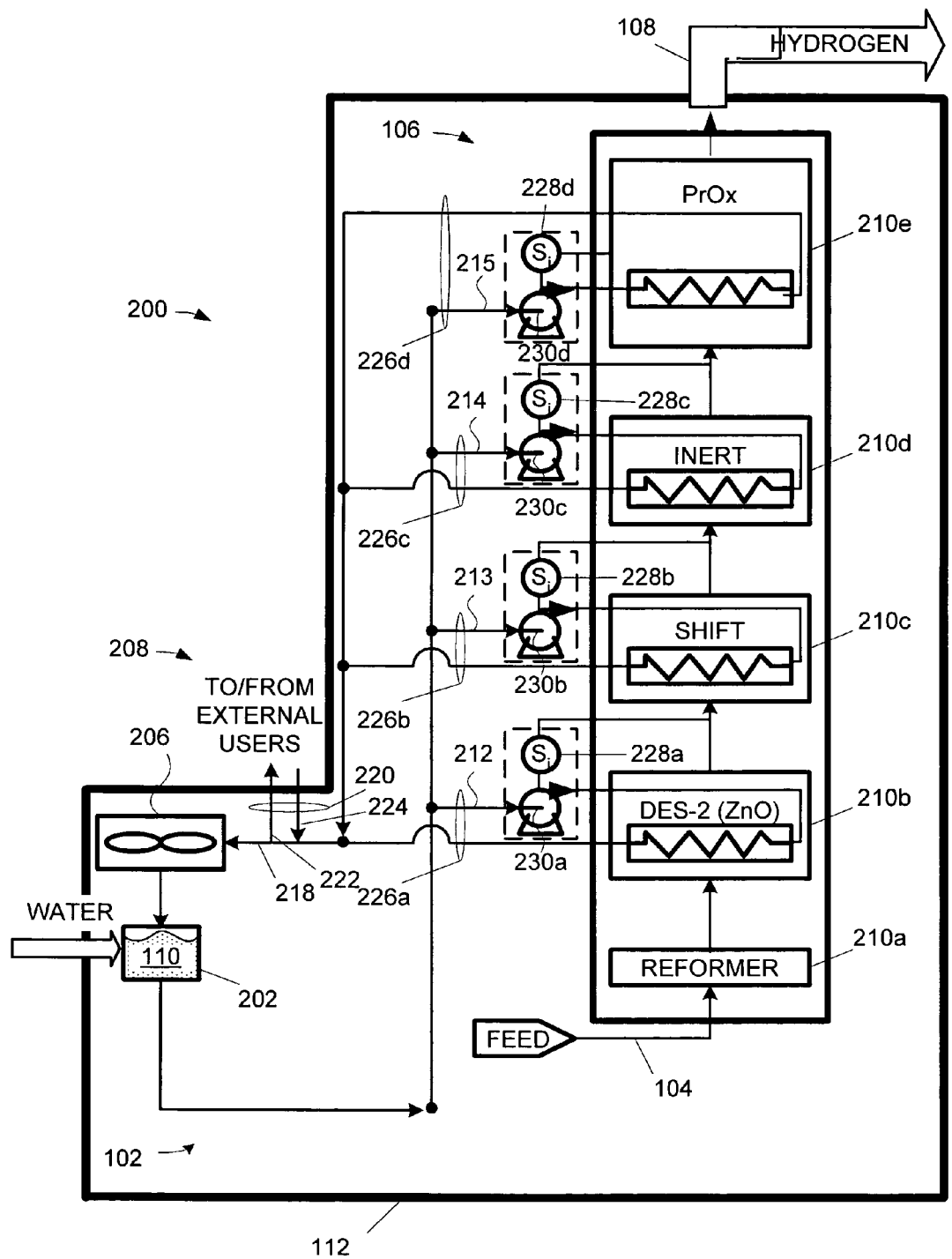
FIG. 8 illustrates a particular embodiment of the fuel processor in FIG. 1.

The coolant system 102 and fuel processor 106 illustrated in FIG. 8 are similar to those of FIG. 2. Specifically, coolant subsystem 102 is used to help achieve the temperatures for the process steps A-F, whatever they may be in a given embodiment. Each of the plurality of processor reactor stages 210b-210e is cooled by a respective branch 226a-226d of the coolant subsystem 102. Associated with respective branches 226a-226d are a plurality of pumps 230a-230d and temperature sensors 228a-228d separately designated by $S_i$. The temperature sensors sense the temperatures of reactants and products flowing through the respective stages 210b-210e and pumps 230a-230d control the flow of coolant through the respective stages 210b-210e in response to the sensed temperatures.

Figure 9:
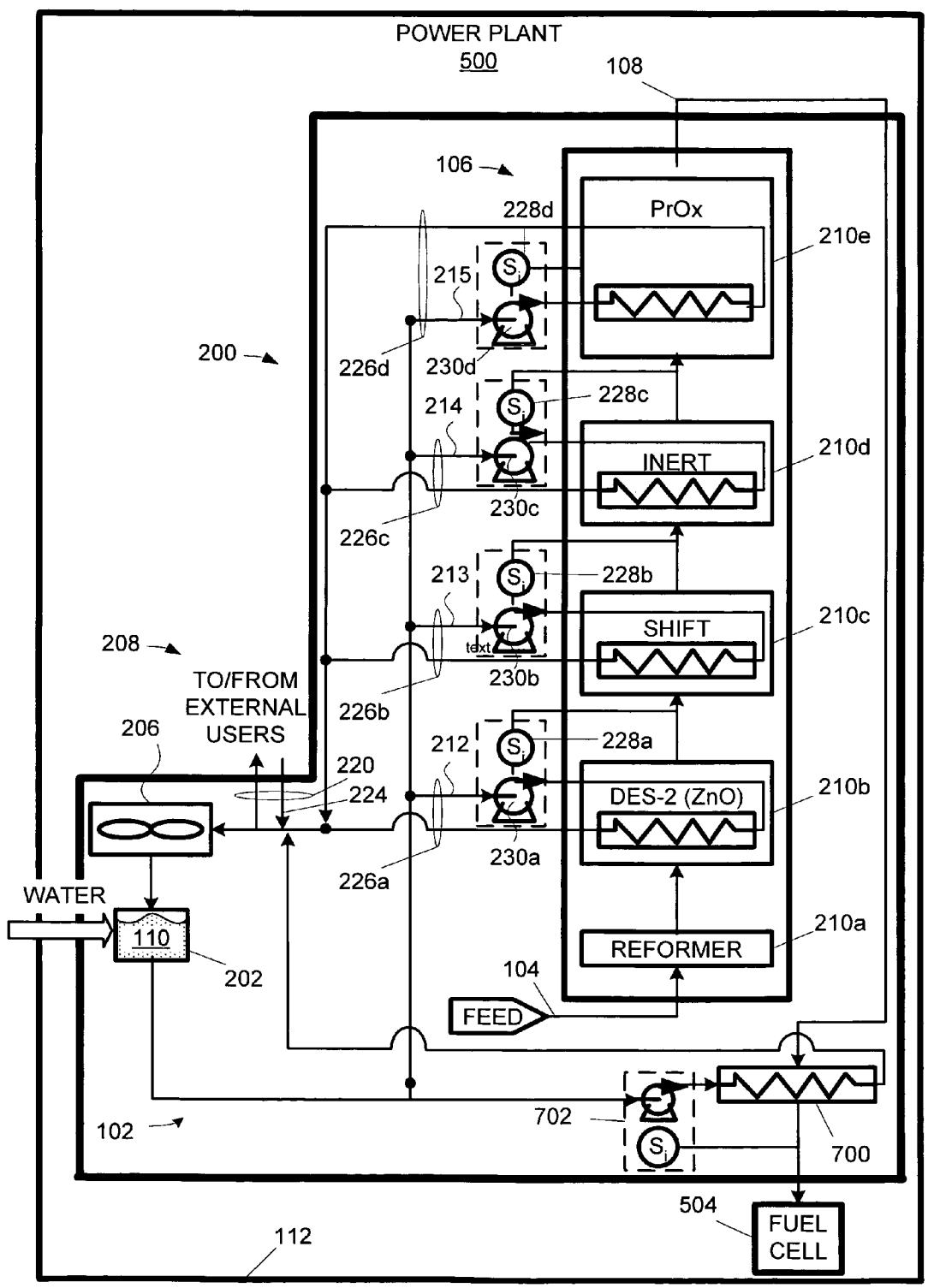
FIG. 9 conceptually illustrates the operational interface between the fuel processor and the fuel cell of the power plant of FIG. 5.

It should be noted that although the pumps and temperature sensors are illustrated in FIG. 8 and FIG. 9 as having a directed connection with one another, in some embodiments, sensed temperature data is relayed to the control system 514 (FIG. 5), which evaluates the data and determines the appropriate response by pumps 230a-230d. When required, instructions for action by one or more of pumps 230a-230d are relayed by control system 514 to the pumps. For instance, if the temperature within one or more of the respective stages 210b-210e approaches or exceeds the upper bound of the desired temperature range for the respective process step A-G, the respective pump(s) 230a-230d is instructed to increase the flow of coolant 110 therethrough. If the temperature within the respective stage(s) 210b-210e approaches or exceeds the lower bound of the desired temperature range for the respective process step A-G, the respective pump(s) 230a-230d is instructed to decrease the flow of coolant 110 therethrough.

The use of a plurality of individual pumps to control the flow of coolant through each of the respective stages 210b-210e results in improved temperature control over the reforming feeds flowing through fuel processor 106. Moreover, it has unexpectedly been observed that such an embodiment produces a reduced parasitic load on a power plant comprising such a coolant system relative to coolant systems that utilize a single pump and a system of valves to control coolant flow through a plurality of reactor stages. This reduction in parasitic load is believed to be due to more precise coolant flow control, the ability to use smaller more efficient pumps, and reductions in coolant flow requirements for downstream reactor stages, e.g., stages 210c-210e.

As each of pumps 230a-230d controls the temperature within their respective stages 210b-210e, the coolant 110 is circulated through the cooler 206. The heat exchanged from the stages 210b-210e is transferred or dumped to the atmosphere. As was described above, this is accomplished by the fans 306 blowing air across the heat exchangers 304. The movement of air across heat exchangers 304 also removes heated air from the cabinet 112 to the exterior of the cabinet 112. Thus, the interior of the cabinet 112 is cooled as the coolant subsystem 102 controls the temperatures of the process steps A-F in the stages 210a-210e.

FIG. 9 graphically illustrates the operational interface between the fuel processor 100 and fuel cell 504. The interface includes a heat exchanger 700 through which coolant 110 may be circulated from the coolant subsystem 102. Heat exchange is controlled through a temperature control unit 702 that throttles the flow of the coolant 110 through the heat exchanger 700 responsive to the sensed temperature of the stream 108. As an alternative, a pump operated in response to the temperature sensed by sensor $S_i$ can also be used in place of temperature control unit 702 to control the flow of coolant through heat exchanger 700. The temperature control unit 702, or a pump when used, is controlled by control system 514 in the same manner as pumps 230a-230d described above. Thus, the heat exchanger 700 and the temperature control unit 702 comprise, in this particular embodiment, a portion of the coolant subsystem 102.

In an embodiment of the present invention, a fuel processor apparatus is provided that includes a processor reactor having a plurality of stages for generating a reformate from a feed, a feed to the processor reactor, and a coolant subsystem separate from the feed, which is capable of circulating a coolant through two or more of the plurality of stages of the processor reactor. The plurality of stages of the processor reactor can include a first stage capable of receiving the feed and performing a reforming reaction thereon, a second stage capable of receiving the feed from the first stage and (a) performing a reaction thereon selected from the group consisting of a reforming reaction, a desulfurization reaction, a shift reaction, and a preferential oxidation reaction, and/or (b) removing heat therefrom, and a third stage capable of receiving the feed from the second stage and (a) performing a reaction thereon selected from the group consisting of a desulfurization reaction, a shift reaction, and a preferential oxidation reaction, and/or (b) removing heat therefrom. The feed to the processor reactor conveys fuel, air, and water and mixtures thereof to the processor reactor.

The coolant subsystem preferably circulates a coolant that includes at least one of water, a glycol, an oil, and an alcohol. The coolant subsystem can include a cooler capable of receiving coolant circulated from the two or more of the plurality of stages of the processor reactor and exchanging heat therefrom, as well as coolant storage, preferably comprising a tank or other reservoir, capable of storing coolant received from the cooler. The cooler can include a heat exchanger and an air blower capable of cooling the heat exchanger. Although referred to as an air blower, any device capable of creating a flow or movement of air across the surface(s) of a heat exchanger, e.g., fans and the like, can be used. Moreover, as described elsewhere herein, the number and combination of heat exchangers and air blowers can be altered without departing from the scope of the invention.

In some embodiments, the coolant subsystem includes a plurality of pumps in fluid communication with the coolant storage. Each of the plurality of pumps is capable of controlling coolant flow and providing a separate flow of coolant to one of the plurality of stages of the processor reactor. In a particular embodiment, a plurality of temperature sensors capable of sensing the temperature of the feed flowing through each of the plurality of stages of the processor reactor is provided and each of the plurality of pumps is operated in response to a sensed temperature of feed within different stages of the processor reactor.

A fuel processor apparatus of the present invention can further include one or more of an oxidizer capable of heating fuel, water, and air and feeding a mixture thereof to the process reactor via the feed, a fuel supply subsystem capable of providing fuel to the oxidizer, a water subsystem capable of providing water to the oxidizer, and an air subsystem capable of providing air to the oxidizer. The apparatus can further include a connection to at least one external user, wherein the connection comprises an outlet and an inlet through which the coolant may be circulated to the at least one external user. The apparatus can also include a fuel cell powered by the reformate generated by the processor reactor of the fuel processor. Furthermore, where apparatus includes a fuel cell, an oxidizer capable of preheating fuel, water, and air to generate a process feed stream to be introduced to the processor reactor is preferably an anode tail-gas oxidizer for combusting anode exhaust gases from the fuel cell.

Optionally, a fuel processor apparatus of the present invention can also include a cabinet for housing or containing the processor reactor. In such an embodiment, the coolant subsystem is capable of cooling the interior of the cabinet in addition to cooling the processor reactor. Specifically, such a coolant subsystem can comprise a cooler capable of receiving coolant circulated from the two or more of the plurality of stages of the processor reactor and exchanging heat therefrom while also being capable of circulating heat from the interior of the cabinet to the exterior of the cabinet. In such an embodiment, the cooler can include a heat exchanger and an air blower capable of cooling the heat exchanger and the cabinet interior by convection. Preferably, the coolant subsystem further includes a coolant storage device or tank capable of storing coolant received from the cooler. A plurality of pumps in fluid communication with the coolant storage can be used to control the flows of coolant to the two or more of the plurality of stages of the processor reactor. In addition, a plurality of temperature sensors capable of sensing the temperatures of the feed flowing through the plurality of stages of the processor reactor can be used to provide temperature data so that the plurality of pumps can be operated in response to the sensed temperature(s) of the feed.

In a process aspect of the present invention, a method of operating a fuel processor is provided that includes feeding a fuel mixture to a processor reactor having a plurality of reactor stages, reforming the fuel mixture in the plurality of reactor stages to produce a reformate, and circulating a coolant through the plurality of reactor stages separate from the fuel mixture to control the temperature of the reforming. The method can further include the step of cooling the reformate produced by the processor reactor by exchanging heat with the circulating coolant.

Preferably, the coolant circulated comprises at least one of water, a glycol, oil and an alcohol. In a particular embodiment, circulating the coolant through the plurality of stages includes storing the coolant and selectively pumping stored coolant to two or more of the plurality of stages. Selectively pumping a stored coolant to two or more of the plurality of stages can include sensing the temperatures of the fuel mixture flowing through the two or more of the plurality of reactor stages and pumping separate flows of coolant to the two or more of the plurality of stages.

The method can further include the step of cooling the circulating coolant through convection. Preferably, the circulating coolant is cooled by circulating the coolant through a heat exchanger and moving air across the heat exchanger. Cooling the circulating coolant can also include sensing the temperature of the coolant and operating the heat exchanger and moving air across the heat exchanger in response to the sensed temperature. Where the fuel processor being operated is housed or contained within a cabinet, it is preferred that the convection also remove heated air from the interior of the cabinet to the exterior of the cabinet.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A fuel processor apparatus, comprising:
    a processor reactor having a plurality of stages generating a reformate from a feed;
    the feed to the processor reactor wherein the feed conveys fuel, air, and water to the processor reactor; and
    a coolant subsystem physically separate from the feed such that there is no fluid communication between the feed and a coolant, wherein the coolant subsystem circulates the coolant through two or more of the plurality of stages of the processor reactor, the coolant comprises water thereby defining a coolant water which at least a portion thereof comprises byproduct water that is an effluent byproduct from the process reactor, wherein the coolant subsystem includes:
    a cooler that receives the coolant circulated from the two or more of the plurality of stages of the processor reactor and exchanging heat therefrom;
    a coolant storage that stores the coolant received from the cooler; and
    a plurality of pumps in fluid communication with the coolant storage, each of the plurality of pumps controlling the flow of coolant to one of the two or more of the plurality of stages of the processor reactor, wherein a fuel cell is powered by the reformate generated by the processor reactor.

2. The apparatus of claim 1, wherein the plurality of stages comprises:
    a first stage that receives the feed and performs a reforming reaction thereon;
    a second stage that receives the feed from the first stage and (a) performs a reaction thereon selected from the group consisting of a reforming reaction, a desulfurization reaction, a shift reaction, and a preferential oxidation reaction, and/or (b) removes heat therefrom; and
    a third stage that receives the feed from the second stage and (a) performs a reaction thereon selected from the group consisting of a desulfurization reaction, a shift reaction, and a preferential oxidation reaction, and/or (b) removes heat therefrom.

3. The apparatus of claim 1, further comprising a plurality of temperature sensors that sense the temperature of the feed flowing through each of the plurality of stages of the processor reactor, and wherein each of the plurality of pumps is operated in response to a sensed temperature of the feed.

4. The apparatus of claim 1, wherein the cooler comprises:
a heat exchanger; and
an air blower that cools the heat exchanger.

5. The apparatus of claim 4, wherein the cooler further comprises:
a second heat exchanger; and
a second air blower that cools the second heat exchanger.

6. The apparatus of claim 1, wherein the coolant further comprises at least one of a glycol, an oil, and an alcohol.

7. The apparatus of claim 1, wherein the coolant storage comprises a tank.

8. The apparatus of claim 1, further comprising:
an oxidizer that heats the fuel, water, and air and feeding the mixture to the process reactor via the feed;
a fuel supply subsystem that provides fuel to the oxidizer;
a water subsystem that provides water to the oxidizer;
an air subsystem that provides air to the oxidizer.

9. The apparatus of claim 1, further comprising a connection to at least one external user.

10. The apparatus of claim 9, wherein the connection comprises an outlet and an inlet through which the coolant is circulated to the at least one external user.

11. The apparatus of claim 9, further comprising an oxidizer that preheats the fuel, water, and air to generate a process feed stream to be introduced to the processor reactor through the feed.

12. The apparatus of claim 11, wherein the oxidizer comprises an anode tail-gas oxidizer.

13. A fuel processor apparatus, comprising:
a processor reactor having a plurality of stages generating a reformate from a feed;
the feed to the processor reactor wherein the feed conveys fuel, air, and water to the processor reactor; and
a coolant subsystem physically separate from the feed such that there is no fluid communication between the feed and a coolant, wherein the coolant subsystem circulates the coolant through two or more of the plurality of stages of the processor reactor, the coolant comprises water thereby defining a coolant water which at least a portion thereof comprises byproduct water that is an effluent byproduct from the process reactor, wherein the coolant subsystem includes:
a cooler that receives the coolant circulated from the two or more of the plurality of stages of the processor reactor and exchanging heat therefrom, the cooler comprising a heat exchanger and an air blower that cools the heat exchanger a coolant storage that stores the coolant received from the cooler; and
a plurality of pumps in fluid communication with the coolant storage, each of the plurality of pumps controlling the flow of coolant to one of the two or more of the plurality of stages of the processor reactor, wherein a fuel cell is powered by the reformate generated by the processor reactor.

14. The apparatus of claim 13, wherein the plurality of stages comprises:
a first stage that receives the feed and performs a reforming reaction thereon;
a second stage that receives the feed from the first stage and (a) performs a reaction thereon selected from the group consisting of a reforming reaction, a desulfurization reaction, a shift reaction, and a preferential oxidation reaction, and/or (b) removes heat therefrom; and
a third stage that receives the feed from the second stage and (a) performs a reaction thereon selected from the group consisting of a desulfurization reaction, a shift reaction, and a preferential oxidation reaction, and/or (b) removes heat therefrom.

15. The apparatus of claim 13, further comprising a plurality of temperature sensors that sense the temperature of the feed flowing through each of the plurality of stages of the processor reactor, and wherein each of the plurality of pumps is operated in response to a sensed temperature of the feed.

16. The apparatus of claim 13, wherein the cooler further comprises:
a second heat exchanger; and
a second air blower that cools the second heat exchanger.

17. The apparatus of claim 13, wherein the coolant further comprises at least one of a glycol, an oil, and an alcohol.

18. The apparatus of claim 13, wherein the coolant storage comprises a tank.

19. The apparatus of claim 13, further comprising:
an oxidizer that heats the fuel, water, and air and feeding the mixture to the process reactor via the feed;
a fuel supply subsystem that provides fuel to the oxidizer;
a water subsystem that provides water to the oxidizer;
an air subsystem that provides air to the oxidizer.

20. The apparatus of claim 13, further comprising a connection to at least one external user.

21. The apparatus of claim 20, wherein the connection comprises an outlet and an inlet through which the coolant is circulated to the at least one external user.

22. The apparatus of claim 20, further comprising an oxidizer that preheats the fuel, water, and air to generate a process feed stream to be introduced to the processor reactor through the feed.

23. The apparatus of claim 22, wherein the oxidizer comprises an anode tail-gas oxidizer.

* * * * *